(12) United States Patent
Imai

(10) Patent No.: US 10,186,147 B2
(45) Date of Patent: Jan. 22, 2019

(54) WRONG-WAY DETERMINATION APPARATUS

(71) Applicant: DENSO CORPORATION, Kariya, Aichi-pref. (JP)

(72) Inventor: Koji Imai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/968,092

(22) Filed: May 1, 2018

(65) Prior Publication Data

US 2018/0247529 A1    Aug. 30, 2018

Related U.S. Application Data

(63) Continuation of application No. 15/107,874, filed as application No. PCT/JP2014/084049 on Dec. 24, 2014, now Pat. No. 9,984,568.

(30) Foreign Application Priority Data

Dec. 24, 2013  (JP) ................................. 2013-265451

(51) Int. Cl.
| | | |
|---|---|---|
| *G06K 9/00* | (2006.01) | |
| *G08G 1/056* | (2006.01) | |
| *G08B 5/22* | (2006.01) | |

(52) U.S. Cl.
CPC ......... *G08G 1/056* (2013.01); *G06K 9/00818* (2013.01); *G08B 5/22* (2013.01)

(58) Field of Classification Search
None
See application file for complete search history.

(56) References Cited

U.S. PATENT DOCUMENTS

| | | | |
|---|---|---|---|
| 2011/0121992 A1 | 5/2011 | Konaka et al. | |
| 2012/0136538 A1 | 5/2012 | Schepp et al. | |
| 2014/0172290 A1* | 6/2014 | Prokhorov | ......... G01C 21/3602 |
| | | | 701/408 |
| 2015/0071496 A1* | 3/2015 | Jeschke | .............. G06K 9/00818 |
| | | | 382/104 |
| 2016/0343253 A1 | 11/2016 | Imai | |

FOREIGN PATENT DOCUMENTS

| | | | |
|---|---|---|---|
| JP | 2004-234486 A | | 8/2004 |
| JP | 2007-140883 A | | 6/2007 |
| JP | 2007-293390 A | | 11/2007 |
| JP | 2007293390 A | * | 11/2007 |
| JP | 2008-181328 A | | 8/2008 |
| JP | 2009-122744 A | | 6/2009 |
| JP | 2009-128944 A | | 6/2009 |
| JP | 2009-129281 A | | 6/2009 |
| JP | 2009-140250 A | | 6/2009 |
| JP | 2009-286172 A | | 12/2009 |
| JP | 2012-058948 A | | 3/2012 |
| JP | 2014-115931 A | | 6/2014 |
| JP | 2014-157395 A | | 8/2014 |

\* cited by examiner

*Primary Examiner* — Hadi Akhavannik
(74) *Attorney, Agent, or Firm* — Knobbe, Martens, Olson & Bear, LLP

(57) ABSTRACT

In a wrong-way determination apparatus, a discriminating unit recognizes a mark contained in the shape of at least one sign candidate and, and discriminates between a front-side or backside of the at least one sign candidate based on the mark. A wrong-way determining unit determines whether a vehicle is travelling the wrong way based on a result of the front-side or backside discrimination.

8 Claims, 8 Drawing Sheets

FIG. 5

| MAP | CARRIAGEWAY /NORMAL WAY | ROAD CONFIGURATION | | | SET THRESHOLD BASED ON DISTURBANCE SIGNS AND SIGN CANDIDATES |
| --- | --- | --- | --- | --- | --- |
| | | ENVIRONMENTS | DIVISIONS | MEDIAN | |
| MAP1 | HIGHWAY OR CARRIAGEWAY | MAIN ROAD | ALTERNATING | | rrd(100%) map1HH |
| | | | ONE-SIDE DOUBLE TRACK | MEDIAN | rrd(100%) map1M |
| | | | | NO MEDIAN | rrd(100%) map1H |
| | | TAXIWAY | | | rrd(100%) map1LL |
| | | NEAR TOLLBOOTH | | | rrd(100%) map1H |
| MAP2 | ORDINARY ROAD | URBAN | ALTERNATING | | rrd(100%) map2HH |
| | | | ONE-SIDE DOUBLE TRACK | MEDIAN | rrd(100%) map2M |
| | | | | NO MEDIAN | rrd(100%) map2H |
| | | SUBURBAN | | | rrd(100%) map2H |
| | | MOUNTAINOUS | | | rrd(100%) map2M |
| MAP3 | ONE-WAY ROAD | EXCEPTION CAN BE EXECUTED TO SHIFT TO WRONG-WAY ALERT STEP 3 IF WRONG-WAY ON ONE-WAY ROAD RECOGNIZED BY CAPTURED IMAGE OR NAVIGATION APPARATUS | | | MAP1 AND MAP2 CAN BE USED BECAUSE NO-ENTRY SIGN MAY NOT BE RECOGNIZED |

FIG. 7

| CAPTURED TIME | (n-3) | (n-2) | (n-1) | (n) | (n+1) | (n+2) | (n+3) | ..... |
|---|---|---|---|---|---|---|---|---|
| NUMBER OF EFFECTIVE SIGNS | VTS(n-3) | VTS(n-2) | VTS(n-1) | VTS(n) | VTS(n+1) | VTS(n+2) | VTS(n+3) | ..... |
| NUMBER OF UNLETTERED SIGNS | VTSNC(n-3) | VTSNC(n-2) | VTSNC(n-1) | VTSNC(n) | VTSNC(n+1) | VTSNC(n+2) | VTSNC(n+3) | ..... |
| OCCURRENCE RATIO OF UNLETTERED SIGNS | RR(n-3) | RR(n-2) | RR(n-1) | RR(n) | RR(n+1) | RR(n+2) | RR(n+3) | ..... |

WRONG-WAY DETERMINATION APPARATUS

CROSS-REFERENCE TO RELATED APPLICATIONS

This application is a continuation application of U.S. patent application Ser. No. 15/107,874, filed on Jun. 23, 2016, which is related to and claims priority from a national stage application under 35 USC § 371(c) of PCT Application No. PCT/JP2014/084049, entitled "WRONG-WAY DETERMINATION APPARATUS," filed on Dec. 24, 2014, which claims priority from Japanese Patent Application No. 2013-265451, filed on Dec. 24, 2013, the disclosure of which is incorporated herein by reference.

TECHNICAL FIELD

The present disclosure relates to wrong-way determination apparatuses for determining whether a vehicle is travelling the wrong way.

BACKGROUND ART

A wrong-way detection apparatus disclosed in patent document 1 is known as an apparatus for detecting wrong-way running of a vehicle. The wrong-way detection apparatus recognizes the size of a traffic signpost in a captured image. Then, the wrong-way detection apparatus determines whether the vehicle is travelling the wrong way according to the difference between the size of the recognized traffic sign and the size of the same traffic sign recognized while the vehicle is travelling the normal way.

CITATION LIST

Patent Document

[Patent Document 1] Japanese Patent Application Publication No. 2007-140883

SUMMARY OF INVENTION

Technical Problem

Unfortunately, the wrong-way detection apparatus may result in reduction of the accuracy of determining whether the vehicle is travelling the wrong way, i.e. in the reverse direction, because the size of a traffic sign in a captured image changes with change of the distance of the traffic sign from the wrong-way detection apparatus. In addition, the wrong-way detection apparatus may be used in only a relatively easily determinable environment, such as a highway.

Specifically, it is possible to recognize the difference between the size of a traffic sign recognized while the vehicle is travelling the wrong way and the size of the same traffic sign while the vehicle is travelling the normal way in the case of a road, such as a highway, where there is a sufficient distance between the running lane and the opposite lane.

In contrast, in the case of an ordinary road, there is a slight difference between the size of a traffic sign recognized while the vehicle is travelling the wrong way and the size of the same traffic sign recognized while the vehicle is travelling the normal way. This is because there is a shorter distance between the running lane and the opposite lane in such an ordinary road. The determination of whether the vehicle is travelling the wrong way by the wrong-way detection apparatus may therefore result in a large error in the case of such an ordinary road.

A first aspect of the present invention seeks to provide wrong-way determination apparatuses, which address the above problem. Specifically, the first aspect of the present invention seeks to provide such wrong-way determination apparatuses, each of which is capable of determining whether a vehicle is travelling the wrong way in any one of various types of roads on which vehicles are runnable.

Means for Solving Problem

A wrong-way determination apparatus according to a first aspect of the present invention includes an extracting unit for extracting at least one sign candidate from a captured image of at least one of a front view and a rear view of the vehicle, the at least one sign candidate having a shape of a traffic sign.

In the specification, a mark is defined as any character(s), figure(s), symbolic sign(s), or three-dimensional shape(s), or any combination thereof, or any combination thereof with color(s).

The wrong-way determination apparatus according to the first aspect of the present invention includes a discriminating unit for recognizing a mark contained in the shape of the at least one sign candidate and for discriminating between a front side or backside of the at least one sign candidate based on the mark. The wrong-way determination apparatus according to the first aspect of the present invention includes a wrong-way determining unit for determining whether the vehicle is travelling the wrong way based on a result of the front-side or backside discrimination.

The wrong-way determination apparatus according to the first aspect of the present invention discriminates the front-side or backside of the at least one sign candidate based on the mark. Then, the wrong-way determination apparatus determines whether the vehicle is travelling the wrong way based on the result of the front-side or backside discrimination.

Specifically, the wrong-way determination apparatus according to the first aspect of the present invention is capable of determining whether the vehicle is travelling the wrong way without recognizing the difference between the size of a traffic sign in a captured image while the vehicle is travelling the wrong way and the size of the same traffic sign in a captured image while the vehicle is travelling the normal way. This enables the wrong-way determination apparatus according to the first aspect of the present invention to easily determine whether the vehicle is travelling the wrong way on 1. Highways, each of which has less disturbances and a longer distance between the travelling lane and the opposing lane, i.e. a highway in which the difference between the size of a traffic sign in a captured image while the vehicle is travelling the wrong way and the size of the same traffic sign in a captured image while the vehicle is travelling the normal way is easily recognizable 2. Ordinary roads, each of which has many disturbances 3. Various road runnable by vehicles.

Note that the number of captured images is not limited to the present invention. It is possible to discriminate the front-side or backside of each of sign candidates extracted from one captured image or discriminate the front-side or backside of each of sign candidates extracted from a plurality of captured images.

A wrong-way detection program, which functions a computer as each of the pieces of means constituting the wrong-wary determination apparatus according to the first aspect of the present invention, can be provided as the second aspect of the present invention. Descriptions in the different claims can be combined to each other as long as possible. In each combination, some elements can be eliminated within the scope of the invention of the corresponding combination.

BRIEF DESCRIPTION OF DRAWINGS

FIG. 5 is a table illustrating an example of threshold values settable according to road classification and road configuration;

FIG. 7 is a table illustrating the correspondence relationship between each of times of pickup and a corresponding one of parameters to be obtained.

DESCRIPTION OF EMBODIMENTS

The following describes an embodiment of the present invention with reference to the accompanying drawings.

Structure of the Present Embodiment

A wrong-way alert system 1, to which the present invention is applied, is incorporated in a vehicle, such as a passenger vehicle. The wrong-way alert system 1 is capable of detecting a vehicle that is travelling the wrong way, i.e. running in a direction opposite to the direction defined based on the regulations, i.e. the road classification. The wrong-way alert system 1 is capable of alerting the driver of the own vehicle and/or other vehicles except for the own vehicle upon determining that a vehicle is travelling the wrong way.

Figure 1:
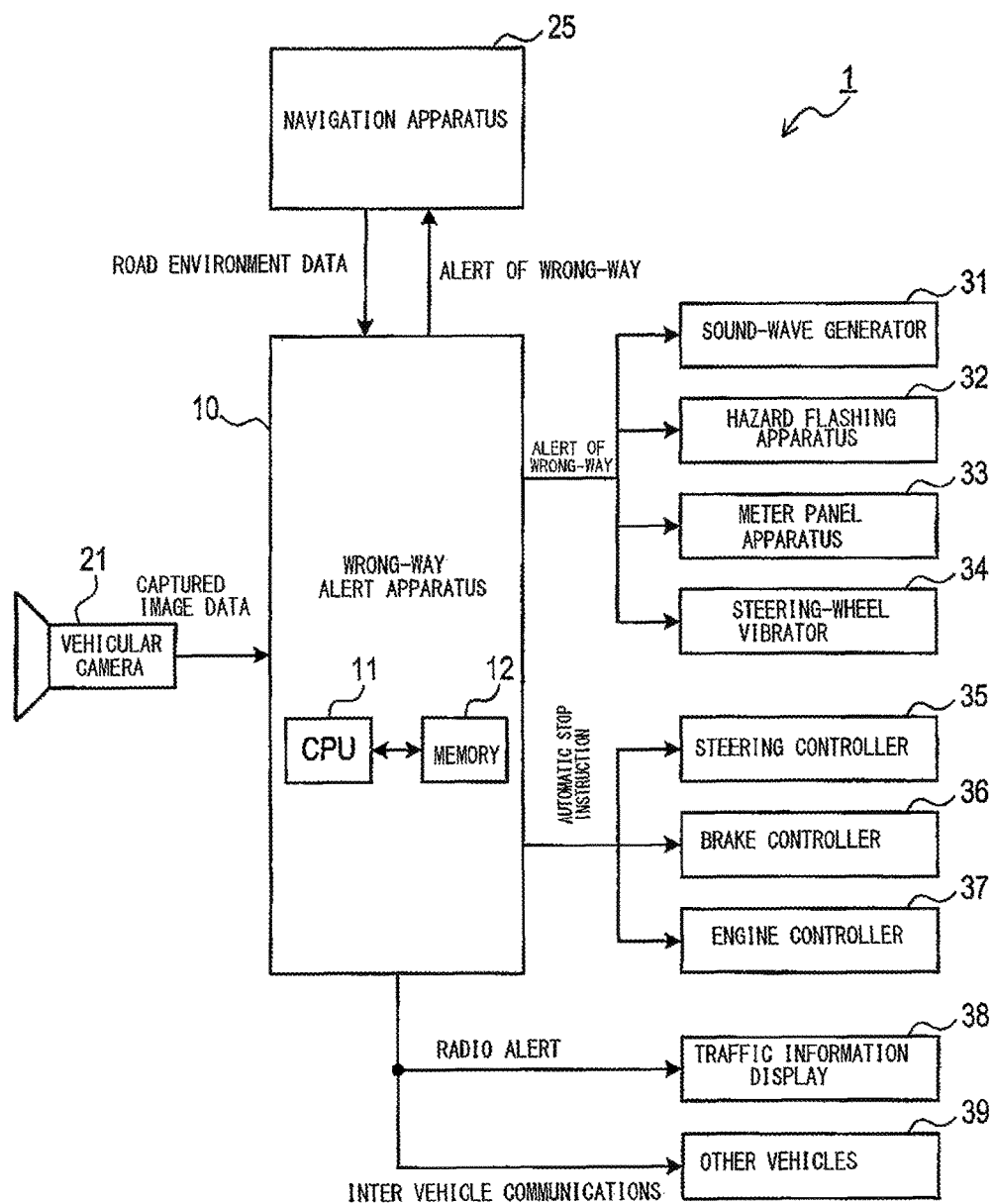
FIG. 1 is a block diagram illustrating the schematic structure of a wrong-way alert system according to a present embodiment of the present disclosure.

Specifically, referring to FIG. 1, the wrong-way alert system 1 includes a wrong-way alert apparatus 10, an vehicular camera 21, a navigation apparatus 25, a sound-wave generator 31, and a hazard flashing apparatus 32. The wrong-way determination apparatus 1 also includes a meter panel apparatus 33, a steering-wheel vibrator 34, a steering controller 35, a brake controller 36, an engine controller 37, and a traffic information display 38.

The vehicular camera 21 is designed as, for example, a well-known camera mounted to the center portion of the front end of the own vehicle; the camera has a predetermined field of view, i.e. an angular field, and captures images in the travelling direction of the own vehicle. The vehicular camera 21 is adapted to perform acquisition of images at cycles of, for example, 30 frames per second (fmp), and send the captured images to the wrong-way alert apparatus 10.

The navigation apparatus 25 includes functions that well-known navigation apparatuses have. The navigation apparatus 25 stores information about road classifications described later and information about road configurations. The navigation apparatus 25 sends part of the road-classification information, which matches with a current location, to the wrong-way alert apparatus 10. The navigation apparatus 25 also sends part of the road-configuration information, which matches with the current location, to the wrong-way alert apparatus 10.

The sound-wave generator 31 generates sound waves, such as voice messages or warning sounds, in accordance with instructions sent from the wrong-way alert apparatus 10.

The hazard flashing apparatus 32 flushes hazards in accordance with instructions sent from the wrong-way alert apparatus 10.

The meter panel apparatus 33 displays warnings indicative of when the own-vehicle is travelling the wrong way in accordance with instructions sent from the wrong-way alert apparatus 10.

The steering-wheel vibrator 34 activates a vibration device installed in the steering wheel in accordance with instructions sent from the wrong-way alert apparatus 10, thus giving warnings to the driver.

The steering controller 35, the brake controller 36, and the engine controller 37 are configured to respectively control the steering, the brake, and the engine of the own vehicle to automatically drive the own vehicle. These devices 35 to 37 are configured to stably stop the own vehicle in accordance with instructions sent from the wrong-way alert apparatus 10 when automatically stopping the own vehicle.

The traffic information display 38 includes a display unit, such as an electrical message board. The traffic information display 38 displays, on the display unit, information for vehicles located around the own vehicle; the information shows that there is a wrong-way vehicle.

Note that, as illustrated in FIG. 1, the wrong-way alert apparatus 10 includes an inter-vehicle communication function that enables the wrong-way alert apparatus 10 to perform inter-vehicle communications with other vehicles around the own vehicle.

The wrong-way alert apparatus 10 is configured as, for example, a computer comprised of a CPU 11 and a memory 12, such as a ROM and a RAM. The CPU 11 performs various tasks including a wrong-way alert task described later in accordance with corresponding programs stored in the memory 12.

Additionally, a database is stored in the memory 12; the database stores information about many traffic signs. The database is used by a method, such as pattern matching, which recognizes traffic signs. Specifically, pieces of image data including most traffic signs located in the regions in which the own vehicle can be used are stored in the database. In addition, various types of information about roads, such as pieces of image data indicative of the structures of center dividers, are stored in the database.

Pieces of image data about specific patterns each drawn on the back of a corresponding one of traffic signs are stored in the memory 12. One example of the specific patterns drawn on the back of a traffic sign for example illustrates a pole supporting the traffic sign and fixing brackets that fixedly join the pole and the road sign. In addition, pieces of image data used for distinguishing center dividers are stored in the memory 12.

Tasks of the Present Embodiment

Figure 2A:
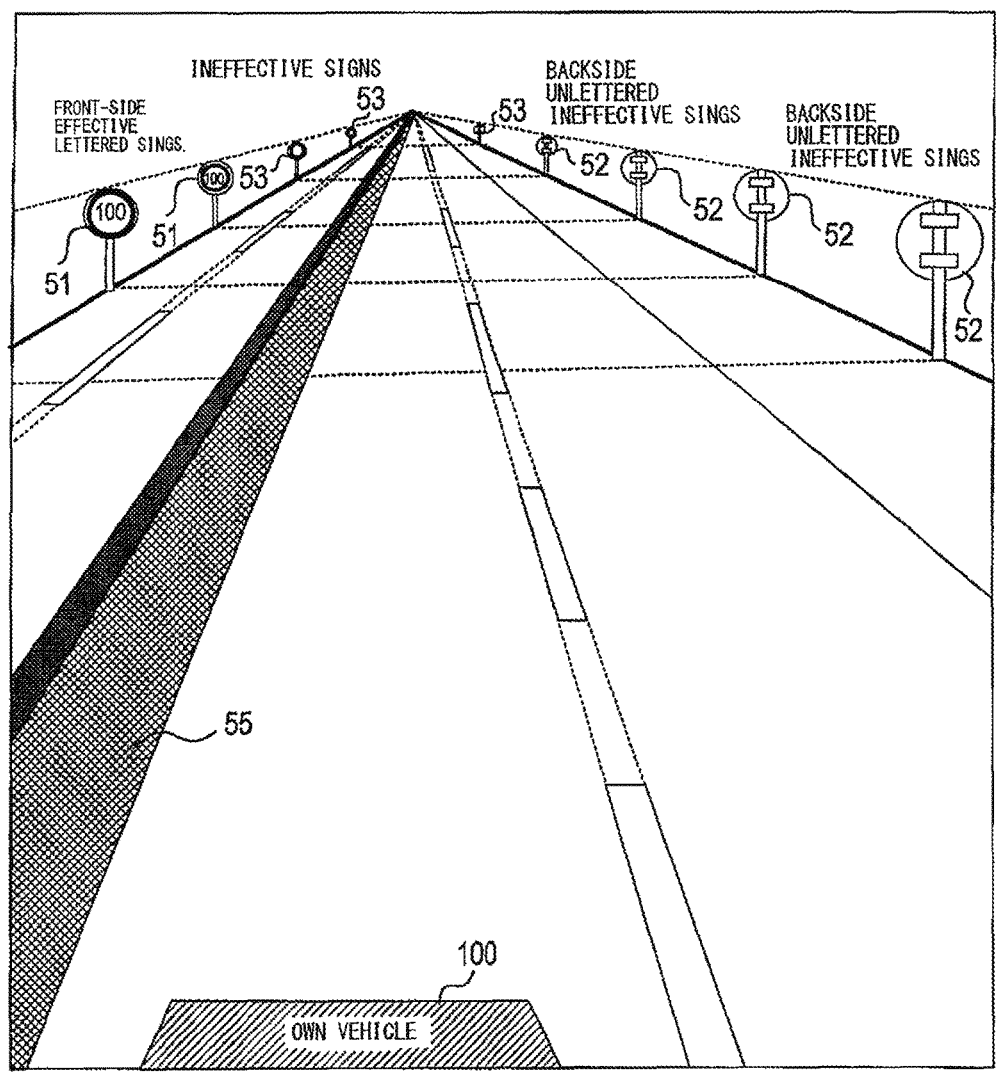
FIG. 2(a) is an explanatory view illustrating the relationships between the classification of traffic signs and a vehicular camera.

Referring to FIG. 2(a), the wrong-way alert apparatus 10, i.e. the CPU 11, of the above wrong-way alert system 1 extracts, from an image captured by the vehicular camera 21, target objects that seem to be road signs, such as effective signs 51 and 52; these target objects that seem to be traffic signs are also referred to as sign candidates.

Figure 2B:
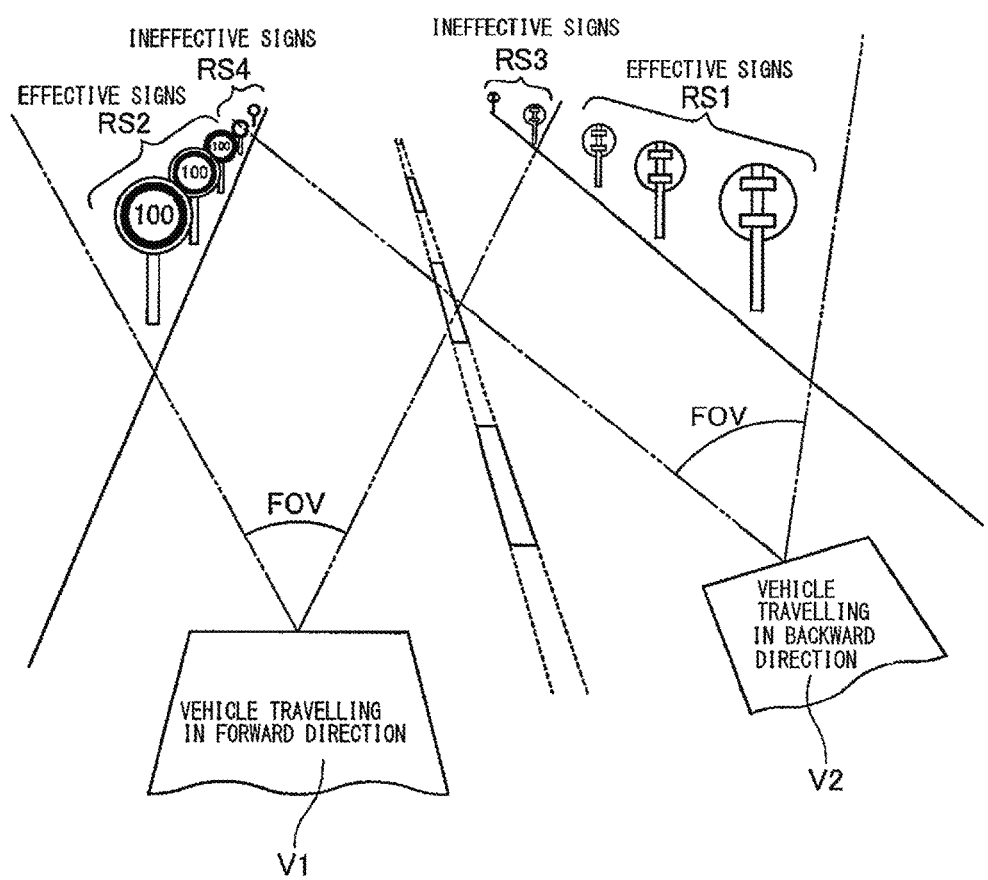
FIG. 2(b) is an explanatory view illustrating the relationships between the classification of traffic signs and an angular field of view of the vehicular camera.

Referring to FIG. 2(b), the imaging range of the vehicular camera 21 mounted to the front of the own vehicle has the shape of a sector centering on the optical axis of the vehicular camera 21 in, for example, the horizontal direction; the shape of a sector depends on the field of view of the vehicular camera 21. A captured image captured by the vehicular camera 21 and sign candidates contained in the captured image have the following relationship based on a running lane and the field of view (FOV).

For example, when a vehicle V1 is travelling on a lane of a road in the forward direction, many effective signs RS2 located to the running-lane side, i.e. many effective signs RS2 whose front-sides face the vehicle V1, are mainly contained in a captured image. Lettered effective signs are an example of such effective signs RS2. In other words, effective signs RS1 located to the opposing-lane side, i.e. effective signs RS1 whose backsides face the vehicle V1, such as unlettered effective signs, are out of the field of view FOV. In addition, signs RS3 contained in the field of view FOV, which are distant from the vehicle V1, may be recognized as ineffective signs. The number of these effective signs contained in a captured image is therefore smaller than the number of effective signs located to the running-lane side.

On the other hand, when a vehicle V2 is reversely travelling the opposing lane, many effective signs RS1 located to the opposing-lane side, i.e. many effective signs RS1 whose back sides face the vehicle V2, are mainly contained in a captured image. Unlettered effective signs are an example of such effective signs RS1. In other words, effective signs RS2 located to the running-lane side, i.e. effective signs RS2 whose front-sides face the vehicle V2, are out of the field of view FOV. In addition, signs RS4 contained in the field of view FOV, which are distant from the vehicle V2, may be recognized as ineffective signs. The number of these effective signs contained in a captured image is therefore smaller than the number of effective signs located to the opposite-lane side.

To sum up, the wrong-way alert system 1 determines whether the own vehicle is travelling the wrong way according to information about sign candidates, i.e. effective candidates, which are recognizable by the position of the road where the own vehicle is running, and to information about the front or back side of each of the sign candidates. Note that, in FIG. 2(a), reference numeral 55 represents a center divider, and reference numeral 100 represents the own vehicle. In FIG. 2(b), reference characters RS3 and RS4 represent ineffective signs.

Figure 3:
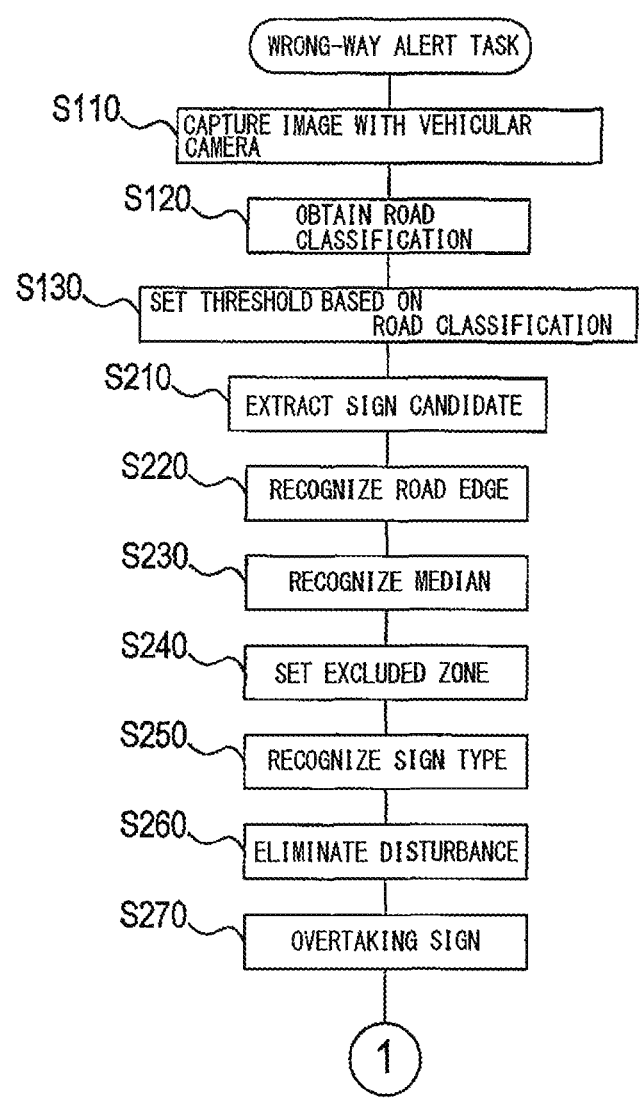
FIG. 3 is a flowchart illustrating a wrong-way driving warning task carried out by a wrong-way alert system, i.e. its CPU, illustrated in FIG. 1.
Figure 4:
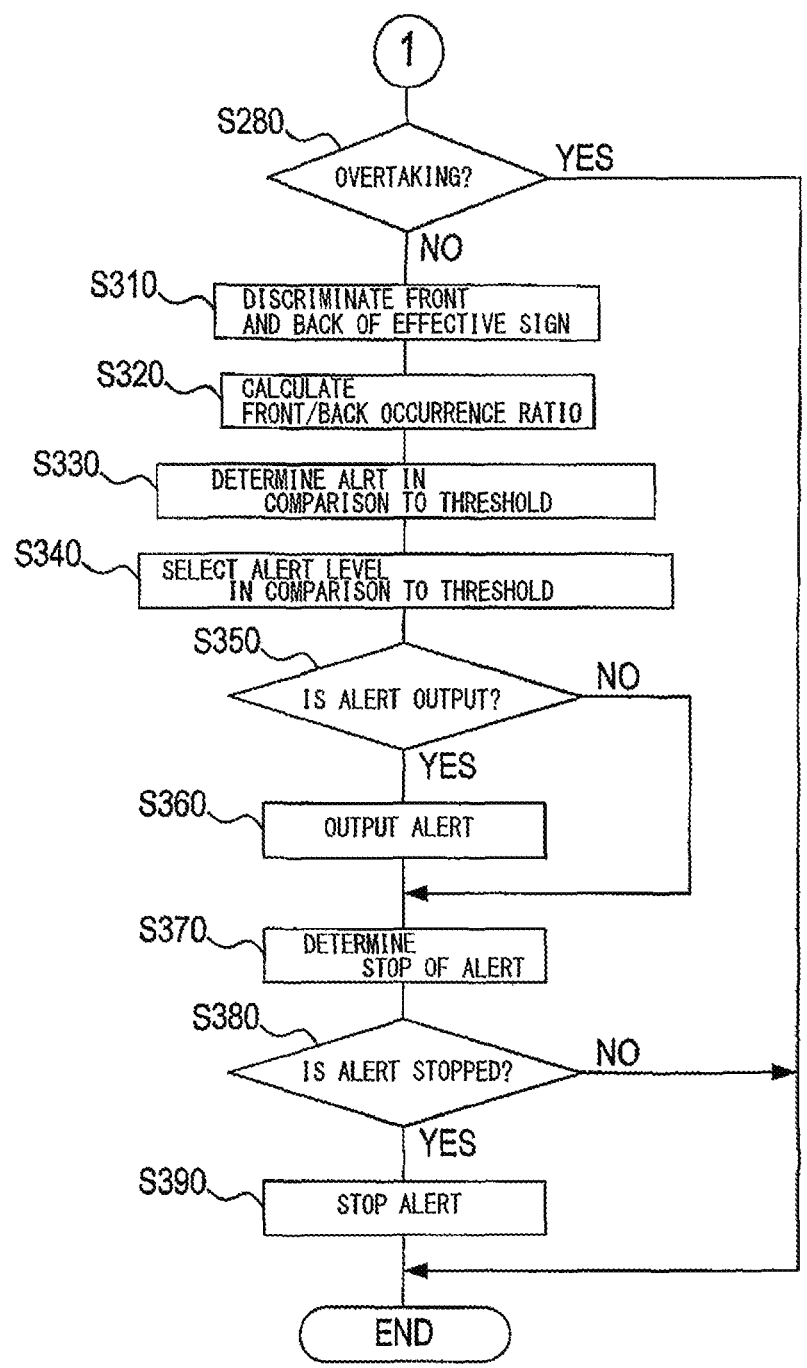
FIG. 4 is a flowchart illustrating the wrong-way driving warning task carried out by a wrong-way alert system, i.e. its CPU, illustrated in FIG. 1.

Specifically, the wrong-way alert system 1, i.e. the CPU 11, performs a task of the determination of the above wrong-way driving as a wrong-way alert task illustrated in FIGS. 3 and 4. The wrong-way alert task is started when, for example, the own vehicle is powered on so that the wrong-way alert system 1 is activated. After the start, the wrong-way alert task is carried out every predetermined period.

When starting the wrong-way alert task, the CPU 11 obtains an image captured by the vehicular camera 21 in step S110. Next, the CPU 11 obtains, from the navigation apparatus 25, the classification of the road on which the own vehicle is running in step S120. Note that, referring to FIG. 5, the road classification represents classifications of road including highways, carriageways, and normal ways other than the highways and carriageways. The road classification also represents whether ordinary roads are one-way roads.

From the navigation apparatus 25, the configuration of the road on which the own vehicle is running is also obtained in addition to the road classification. The road configuration represents information about road environments, traffic divisions, and roads with/without medians.

Next, the CPU 11 sets a threshold suitable for the road on which the own vehicle is running based on the road classification and/or the road configuration in step S130. The threshold represents a threshold used in step S330. That is, the threshold represents a threshold for determining whether the own vehicle is travelling the wrong way.

As illustrated in FIG. 5, the CPU 11 sets the threshold to map1HH if the road classification of the road on which the own vehicle is running is a highway or carriageway, and the road configuration is a main and alternating traffic road in step S130.

The CPU 11 sets the threshold to map1M if the road configuration of the road on which the own vehicle is running is a main and one-side double track road with medians. The CPU 11 also sets the threshold to map1H if the road configuration of the road on which the own vehicle is running is a main and one-side double track road without medians.

The CPU 11 sets the threshold to map1LL if the road configuration of the road on which the own vehicle is running is a taxiway. The CPU 11 sets the threshold to the map1H if the road configuration of the road on which the own vehicle is a road near the corresponding tollbooth. The magnitude relation among the respective thresholds map1HH, map1H, map1M, and map1LL is defined based on the following relational equation:

$$map1HH > map1H > map1M > map1LL$$

the CPU 11 sets the threshold to map2HH if the road classification of the road on which the own vehicle is running is a normal way, and the road configuration is an urban alternating traffic road. The CPU 11 sets the threshold to map2M if the road configuration of the road on which the own vehicle is running is an urban main and one-side double track road with medians. The CPU 11 also sets the threshold to map2H if the road configuration of the road on which the own vehicle is running is an urban main and one-side double track road without medians.

The CPU 11 sets the threshold to map2H if the road configuration of the road on which the own vehicle is running is a suburban road. The CPU 11 sets the threshold to the map2M if the road configuration of the road on which the own vehicle is a mountainous road. The magnitude relation among the respective thresholds map2HH, map2H, and map2M is defined based on the following relational equation:

$$map2HH > map2H > map2M$$

The thresholds map2HH, map2H, and map2M used if the road classification of the road on which the own vehicle is running represents an ordinary road are overall higher than the thresholds map1HH, map1H, map1M, and map1LL used if the road classification of the road on which the own vehicle is running represents a highway or a carriageway.

Specifically, the operation in step S130, which sets the threshold to a higher value in an environment with many disturbances, makes it difficult to detect the wrong-way running, thus reducing false detections. In contrast, the operation in step S130, which sets the threshold to a lower value in an environment with small disturbances, enables determination of the wrong-way running to be reliably detected.

Note that disturbances represent factors that have a negative impact on the accuracy of the calculating task of calculating the percentage of the number of lettered or unlettered signs to the number of effective signs described later. The CPU 11 sets the threshold to an extremely small value in step S130. This setting enables an alert with a maximum level, i.e. STEP3 described later, to be exceptionally generated if it is determined that the own vehicle is travelling the wrong way and the road classification represents a one-way road.

Subsequently, the CPU 11 extracts, from the captured image, sign candidates for traffic signs in step S210. For example, the CPU 11 determines whether the degree of coincidence between at least one of parameters of a target object contained in the captured image and a corresponding at least one of parameters previously stored in the memory 12 is higher than a reference value. The parameters of an object include, for example, the shape, color, and pattern of the target object, and the parameters stored in the memory 12 serve as information representing the marks of traffic signs. Upon determining that the degree of coincidence between at least one of parameters of a target object contained in the captured image and a corresponding at least one of parameters previously stored in the memory 12 is higher than the reference value, the CPU 11 stores the target object as a sign candidate for traffic signs in the memory 12.

Note that traffic signs contained in a captured image, which are not determined as sign candidates because, for example, their sizes are too small, are illustrated in FIGS. 2(a) and 2(b) as ineffective signs 53. Traffic signs contained in a captured image, which are determined as sign candidates are illustrated in FIGS. 2(a) and 2(b) as effective signs 51 and 52. The effective signs 51 and 52 are further categorized by a task described later.

Next, the CPU 11 recognizes edges of the road on which the own vehicle is running in step S220. Note that the road edges represent right and left edges of the road on which the own vehicle is running. For example, the road edges represent while lines or curbs. The road edges can be recognized by a known image processing technology.

Subsequently, the CPU 11 determines whether there is a median, i.e. center divider, on the road on which the own vehicle is running, and recognizes the structure of the median when determining that there is a median in step S230. That is, the CPU 11 recognizes information indicative of whether there is a median, and information indicative of the structure, such as a guardrail or a shrubbery, constituting the median using image processing, such as pattern matching, based on the information about medians stored in the memory 12.

The CPU 11 establishes excluded zones in step S240. Note that the excluded zones area is defined such that sign candidates detected in the excluded zones are not used as sign candidates, i.e. are excluded from sign candidates, in the following operations (steps).

Figure 6A:
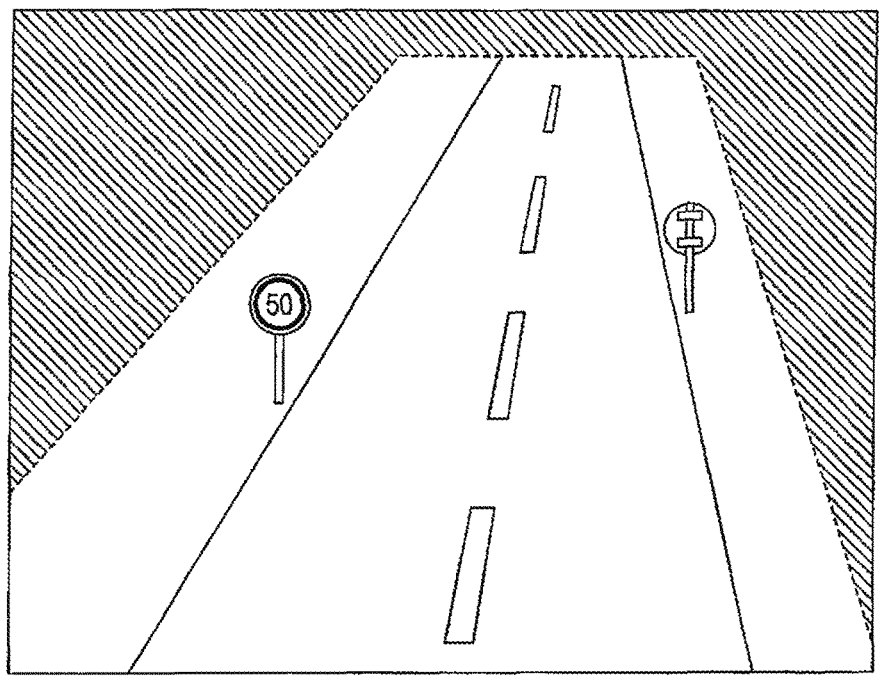
FIG. 6(a) is an explanatory view illustrating an example of except areas.

For example, referring to FIG. 6(a), the CPU 11 draws boundary at a position located across a predetermined scope from each edge of the road on which the own vehicle is running; the predetermined scope represents a scope on which traffic signs are estimated to be located. The CPU 11 establishes zones located outside the boundaries as excluded zones (see hatched regions in FIG. 6(a)).

Next, the CPU 11 recognizes sign types in step S250. Specifically, the CPU 11 recognizes whether each traffic candidate matches with any one of traffic signs in accordance with a database of the traffic signs stored in the memory 12.

FIG. 2 illustrates sign candidates, each of which contains a sign symbol, such as letters and/or symbolic signs, in the shape thereof and is determined to match with a corresponding traffic sign in step S250, as a lettered effective sign 51. In contrast, FIG. 2 illustrates sign candidates, none of which contains a sign symbol, such as letters and/or symbolic signs, in the shape thereof and is determined not to match with a corresponding traffic sign in step S250, as a unlettered effective sign 52.

Subsequently, the CPU 11 eliminates disturbances in step S260. Specifically, sign candidates, which are eliminated as disturbances, include (I) Signs indicative of the positions of emergency telephones (II) Signs for both vehicles and, for example, pedestrians, including double-sided signs, such as signs indicative of no pedestrian closing, signs indicative of safety zones, signs for pedestrian roads, signs for pedestrian crossings, pedestrian traffic-light signs, and hydrant signs (III) Signs located on medians (IV) Signs for vehicles travelling on another parallel road (V) Shop signs around the road.

Note that electronic signs and signs with covers located to, for example, highways, which can indicate information only when necessary, are determined as effective signs. In principal, these electronic signs and signs with covers are determined as effective signs only when they indicate information, and eliminated as disturbances when they do not indicate information. An electronic sign or sign with a cover, whose display side and backside are clearly distinguishable due to its color tone, is determined as an effective sign even if the electronic sign or sign with the cover indicated no information For example, information about sign candidates, which are determined as (I) and (II) disturbances, is recorded beforehand in the memory 12 as disturbance signs. The CPU 11 eliminates a sign candidate as a disturbance when determining, using, for example, pattern matching, that the sign candidate matches with a disturbance candidate stored in the memory 12. The CPU 11 also eliminates a sign candidate as the (III) disturbances when determining, using, for example, pattern matching, that the sign candidate matches with a specific sign located on a median, such as a sign indicative of the distance.

The CPU 11 can recognize a median using pattern matching, such as imaging processing based on the shapes of guardrails, and eliminate, as the (III) disturbances, sign candidates located close to the recognized median as signs located on the median. In addition, the CPU 11 eliminates, as the (IV) disturbances, sign candidates, which belong to the excluded zones.

For example, information indicative of the shapes and/or colors of various shop signs, which are determined as (V) disturbances, is recorded beforehand in the memory 12. The CPU 11 eliminates a sign candidate when determining, using, for example, pattern matching, that the sign candidate matches with the information indicative of one of the shop signs. In step S210, the CPU 11 can be configured not to extract sign candidates matching with shop signs. Sign candidates, which have been eliminated in step S260, are handled as sign candidates which are not effective candidates in the following operations (steps).

Next, the CPU 11 recognizes whether the own vehicle is overtaking other vehicles in step S270. Specifically, in step S270, the CPU 11 monitors the positon of the own vehicle on the corresponding road and/or the positional relationships between the own vehicle and another vehicle for example, using at least one of (1) Time-series pieces of information sent from the navigation apparatus 25

(2) Time-series images captured by the vehicular camera 21

(3) Time-series pieces of information measured by a sensor for measuring the position of another vehicle.

Then, the CPU 11 recognizes that the own vehicle is overtaking when determining that the own vehicle has moved from the lane on which the own vehicle has run to an overtaking lane and there is another vehicle on the lane on which the own vehicle has run. Information representing that the own vehicle is overtaking is recorded in the memory 12, and the information will be eliminated at the end of the overtaking.

Subsequently, the CPU 11 determines, based on the results of the operation in step S270, whether the own vehicle is overtaking another vehicle in step S280. The CPU 11 terminates the wrong-way alert task without executing the subsequent operations from step S280 when determining that the own vehicle is overtaking another vehicle (YES in step S280). Otherwise, the CPU 11 executes a task for discriminating between the front-side or backside of each effective sign when determining that the own vehicle is not overtaking another vehicle (NO in step S280) in step S310.

In step S310, the CPU 11 determines that effective signs, whose sign symbols have been recognized based on pattern matching in step S250, in the effective signs are front-side effective signs. The front-side effective signs are for example illustrated in FIGS. 2(a) and 2(b) as lettered effective signs.

In contrast, in step S310, the CPU 11 determines that effective signs, whose sign symbols have not been recognized based on pattern matching in step S250, in other words, whose front-sides are not recognized, in the effective signs are backside effective signs. The CPU 11 also determines that effective signs, which are recognized by their backsides, based on pattern matching in step S250, in the effective signs are backside effective signs.

For example, if a supporting pole and joints, such as brackets, are recognized in the shape of a sign candidate or the total color of the shape of a sign candidate is gray or silver, the sign candidate is recognized as a backside effective sign.

A mark in the present embodiment means any character(s), figure(s), symbolic sign(s), or three-dimensional shape(s), or any combination thereof, or any combination thereof with color(s) in the present embodiment. Specifically, the CPU 11 discriminates, based on the mark expressed in the shape of a sign candidate, i.e. an effective sign, whether the sign candidate (effective sign) is a front-side effective sign or a backside effective sign in step S310.

Subsequently, the CPU 11 determines whether the own vehicle is travelling the wrong way as a function of the results of the discrimination in step S310, i.e. information indicative of whether each recognized effective sign is a front-side effective sign or a backside effective sign in steps S320 and S330.

For example, the CPU 11 is capable of determining whether the own vehicle is travelling the wrong way as a function of the ratio of the number of front-side effective signs and the number of backside effective signs in a plurality of effective signs recognized thereby in step S320. This is because the number of backside effective signs is larger than the number of front-side effective signs if the own vehicle is travelling the wrong way on an oncoming lane.

In addition, the CPU 11 is capable of determining that the own vehicle is travelling the wrong way when a number of backside effective signs, which is larger than a predetermined number, are successively discriminated in step S320. This is because there is a high probability that backside effective signs are successively discriminated.

The CPU 11 according to the present embodiment calculates a front/back occurrence ratio as the wrong-way discriminating task in step S320, and determines whether the own vehicle is travelling the wrong way using the front/back occurrence ratio. The following describes this task in detail.

First, the CPU 11 calculates the front/back occurrence ratio in step S320. The CPU 11 calculates an unlettered-sign occurrence ratio, i.e. an occurrence ratio of backside effective signs, referred to simply as a back occurrence ratio, in accordance with the following equation if the vehicular camera 21 is mounted to the front of the own vehicle, which captures images in the forward direction of the own vehicle according to the present embodiment:

$$R = \frac{C}{V} \tag{1}$$

Where R represents the back occurrence ratio, C represents the number of unlettered effective signs, i.e. backside effective signs, in the total effective signs, and V represents the number of the total effective signs.

Note that the number of backside effective signs corresponds to, for example, the number of target sign candidates according to the present embodiment.

The vehicular camera 21 can be mounted to, for example, the center of the rear end of the own vehicle, so that the vehicular camera 21 can capture images in the opposite direction of the forward direction of the own vehicle. The CPU 11 can calculate a lettered-sign occurrence ratio, i.e. an occurrence ratio of front-side effective signs, referred to simply as a front occurrence ratio, in place of the backside occurrence ratio if the vehicular camera 21 captures images in the opposite direction of the forward direction of the own vehicle. In this case, the CPU 11 can use the front-side occurrence ratio in place of the backside occurrence ratio in the following operations. In this case, the number of front-side effective signs corresponds to, for example, the number of target sign candidates according to the present embodiment.

The limitation of the field of view FOV illustrated in FIG. 2(b) results in many backside effective signs RS2 located on the running lane side being mainly contained in an image of the opposite side of the front of a vehicle V1 if the vehicle V1 is normally travelling a lane of a road. The backside effective signs RS2 are effective signs whose backsides face the rear end of the vehicle V1 when viewed from the rear end of the vehicle V1.

In contrast, many front-side effective signs RS1 located on the opposing lane side are mainly contained in an image of the opposite side of the front of a vehicle V1 if the vehicle V1 is reversely travelling the opposing lane. The front-side effective signs RS1 are effective signs whose front-sides face the rear end of the vehicle V1 when viewed from the rear end of the vehicle V1.

The CPU 11 according to the present embodiment calculates, based on frame images captured by the vehicular camera 21, an averaged back occurrence ratio in frame images.

Let us assume that the number of effective signs, which have been recognized at capturing time n corresponding to a captured image frame n is represented as VTS(n), the number of unlettered signs is represented as VTSNC(n), and the back occurrence ratio is represented as RR(n). In this assumption, the values of these parameters at respective capturing times (n−3), (n−2), (n−1), (n), (n+1), (n+2), and (n+3) are represented in the table illustrated in FIG. 7.

Then, the CPU 11 performs the filtering based on the following equation (2) to calculate the averaged back occurrence ratio RRD(n):

$$RRD(n) = \frac{1}{4}\{RR(n-3)+RR(n-2)+RR(n-1)+RR(n)\} \quad (2)$$

Specifically, the CPU 11 averages the four back occurrence ratios RR(n−3), RR(n−2), RR(n−1), and RR(n) corresponding to four frames to calculate the averaged back occurrence ratio RRD(n) accordingly; the averaged back occurrence ratio RRD(n) will also be referred to simply as a back occurrence ratio RRD(n). Note that the number of frames to be averaged can be freely determined.

The CPU 11 can also calculate the sum of the number of effective signs VTCS(n−3), the number of effective signs VTCS(n−2), the number of effective signs VTCS(n−1), and the number of effective signs VTCS(n), which correspond to the past four frames. In addition, the CPU 11 can calculate the sum of the number of unlettered signs RR(n−3), the number of unlettered signs RR(n−2), the number of unlettered signs RR(n−1), and the number of unlettered signs RR(n), which correspond to the past four frames. Then, the CPU 11 can perform division based on the calculated sums based on the following equation (3), thus calculating the averaged back occurrence ratio RRD(n):

$$RRD(n) = \frac{VTSC(n-3)+VTSC(n-2)+VTSC(n-1)+VTSC(n)}{VTS(n-3)+VTS(n-2)+VTS(n-1)+VTS(n)} \quad (3)$$

Additionally, the CPU 11 can calculate the averaged back occurrence ratio RRD(n) using the equation in which weighting coefficients w(n) are multiplied to the respective terms of the equation (3) (see the following equation (4)):

$$RRD(n) = \frac{w(n-3)\cdot VTSC(n-3)+w(n-2)\cdot VTSC(n-2)+w(n-1)\cdot VTSC(n-1)+w(n)\cdot VTSC(n)}{w(n-3)\cdot VTS(n-3)+w(n-2)\cdot VTS(n-2)+w(n-1)\cdot VTS(n-1)+w(n)\cdot VTS(n)} \quad (4)$$

Note that the weighting coefficients w(n) can be set to be within the range from 0 to 1 inclusive. It is preferable that, the closer the corresponding pieces of data to the current time are, the larger the values of the weighting coefficients w(n). It is likely that, when the pieces of data are closer to the current time, the pieces of data can reflect the running conditions of the vehicle more accurately.

Next, the CPU 11 compares the threshold set in step S130 in magnitude with the averaged back occurrence ratio calculated in step S320 to perform the determination of wrong-way running and the determination of alert. In this operation, the CPU 11 compares the averaged back occurrence ratio RRD(n) calculated in step S320 with the threshold set in step S130. The following refers to the threshold set in step S130 as rrd(100%). The CPU 11 determines that the own vehicle is travelling the wrong way at 100 percent on the logic of the wrong-way alert task when determining that the averaged back occurrence ratio RRD(n) is equal to or higher than the threshold rrd(100%).

The CPU 11 performs the maximum possible tasks available for safety in addition to a task for a case where the following equation (7) is satisfied when determining that the averaged back occurrence ratio RRD(n) is equal to or higher than the threshold rrd(100%). For example, the CPU 11 honks the horn and/or reports an emergency message to, for example, police when determining that the averaged back occurrence ratio RRD(n) is equal to or higher than the threshold rrd(100%).

Note that the front-side occurrence ratio can be used if the vehicular camera 21 captures images in the opposite direction of the forward direction of the own vehicle described above. Specifically, the CPU 11 determines that the own vehicle is travelling the wrong way upon determining that the front-side occurrence ratio is equal to or higher than the threshold rrd(100%) in step S330 if images in the backward direction are captured.

The wrong-way alert system 1 according to the present embodiment can perform the determination using the backside occurrence ratio in place of the front-side occurrence ratio if the images in the backward direction are captured. Specifically, the CPU 11 according to this modification can convert the threshold rrd(100%) for frontward images into rrd'(100%) for backward images in accordance with the following equation (4a):

$$rrd'(100\%)=1-rrd(100\%) \quad (4a)$$

Then, the CPU 11 can determine that the own vehicle is travelling the wrong way when determining that the back-side occurrence ratio RRD(n) is equal to or lower than the threshold rrd'(100%).

For example, in parallel with the operation in step S330, the CPU 11 estimates the probability that the own vehicle is travelling the wrong way as a function of the magnitude relation and/or ratio between the back occurrence ratio RRD(n) and the threshold rrd(100%). Subsequently, the CPU 11 selects one of alert levels, i.e. alert messages; the selected alert level or message collates with the estimated wrong-way probability in step S340. In this operation, the CPU 11 determines the wrong-way probability and the alert message in accordance with the relationships between the backside occurrence ratio RRD(n) and the product of the threshold rrd(100%) set based on the table illustrated in FIG. 5 and each of constant values.

$$rrd(100\%)\times 0.5 > RRD(n) >= rrd(100\%)\times 0.3 \quad (5)$$

If the relationship of the equation (5) is satisfied as an example, the CPU 11 is configured to (1) Determine that there is a level of the wrong-way probability, and that the level of the wrong-way probability is lower than a predetermined alert level (2) Issue an alert, i.e. a warning indicative of wrong-way caution.

The warning of wrong-way caution represents the lightest level warning. For example, the CPU 11 activates the sound-wave generator 31 so that the sound-wave generator 31 outputs chime sound, buzzer sound, or a sound message "there is a probability of the wrong-way running". The CPU 11 also activates the meter panel apparatus 33 so that the meter panel apparatus 33 displays such a longitude warning.

$$rrd(100\%)\times 0.8 > RRD(n) >= rrd(100\%)\times 0.5 \quad (6)$$

If the relationship of the equation (6) is satisfied as an example, the CPU 11 is configured to (1) Determine that the level of the wrong-way probability is equal to or higher the predetermined alert level (2) Issue an alert, i.e. a warning, indicative of wrong-way confirmation recommendation.

Specifically, the CPU 11 causes, for example, the sound-wave generator 31 to generate an audible alarm or alert sound, which gets more attention than the wrong-way caution. The CPU 11 can activate the meter panel apparatus 33 so that the meter panel apparatus 33 displays a more attentional message, and/or cause the steering-wheel vibrator 34 to vibrate, thus directly notifying the driver's body.

$$RRD(n)>=rrd(100\%) \times 0.8 \qquad (7)$$

If the relationship of the equation (7) is satisfied as an example, the CPU 11 is configured to (1) Determine that the level of the wrong-way probability has reached a conclusive level (2) Issue a conclusive wrong-way alert.

Specifically, the CPU 11 is configured to perform, as the conclusive wrong-way alert, at least one of (1) A task to activate the hazard flashing apparatus 32

(2) A task to send a stop instruction for stopping the own vehicle to the steering controller 35, brake controller 36, engine controller 37, and other similar devices in addition to the activation of the sound-wave generator 31 in the warning indicative of wrong-way confirmation recommendation.

The activated hazard flashing apparatus 32 flashes hazard lamps of the own vehicle to alert someone of danger. The steering controller 35, brake controller 36, engine controller 37, and other similar devices are responsive to the stop instruction to bring the own vehicle to a safety place.

If the relationship of the equation (7) is satisfied as an example, the CPU 11 outputs information indicative of the own vehicle travelling the wrong way to infrastructural equipment, such as the traffic information display 38, thus causing the traffic information display 38 to display a message representing that "there is a vehicle travelling the wrong way". Note that the CPU 11 preferably outputs a sound message for the driver's safety when outputting information indicative of the own vehicle travelling the wrong way out of the own vehicle via the infrastructural equipment. The sound message is, for example, that "Wrong Way Alert ! Please check your driving detection, and ensure your safety and your surrounding safety".

Note that the CPU 11 can communicate with other vehicles 39 (see FIG. 1) around the own vehicle using its inter-vehicle communication function to output information representing that the own vehicle is travelling the wrong way to the other vehicles 39 when outputting the information to the traffic information display 38.

Subsequently, the CPU 11 determines whether to output an alert in step S350. In this operation, the CPU 11 performs the determination in accordance with the magnitude relations between the backside occurrence ratio and the threshold rrd(100%); the magnitude relations are defined based on the equations (5) to (7).

The CPU 11 outputs an alert when determining to output an alert (YES in step S350) in step S360. That is, the CPU 11 performs a selected one of the previously established alert tasks set forth above in accordance with the level of the wrong-way probability of the own vehicle and the equations (5) to (7).

The CPU 11 carries out the following step S370 when determining not to output an alert (NO in step S350).

In step S370, the CPU 11 performs an alert stop determination task. In this operation, the CPU 11 determines whether to stop the currently outputted alert. Specifically, the CPU 11 determines to stop the alert upon determining that (1) There is a driver's operation to cancel the alert to the device(s) outputting the alert (2) The own vehicle is stopped.

Specifically, upon determining to stop the alert (YES in step S380), the CPU 11 performs an alert output stop task that outputs, to the device(s) that is outputting the alert, a signal for stopping the alert in step S390, and thereafter terminates the wrong-way alert task.

Otherwise, upon determining not to stop the alert (NO in step S380), the CPU 11 terminates the wrong-way alert task without performing the alert output stop task.

Advantageous Effect of the Present Embodiment

The wrong-way alert apparatus 10 in the wrong-way alert system 1 according to the present embodiment extracts at least one sign candidate, which has the shape of a traffic sign, from a captured image obtained by capturing at least one of the front scene, i.e. front view, or rear scene, i.e. rear view, of the own vehicle. Then, the wrong-way alert apparatus 10 executes the task for discriminating between the front-side or backside of the at least one sign candidate using a mark expressed in the shape of the at least one sign candidate.

The wrong-way alert apparatus 10 detects the wrong-way running of the own vehicle as a function of the discriminated results.

Specifically, as illustrated in FIG. 2(b), the number of front-side effective signs is larger than the number of backside effective signs when the own vehicle is travelling a lane of a road on the normal way. On the other hand, the number of backside effective signs is larger than the number of front-side effective signs when the own vehicle is travelling an opposing lane of a road on the wrong way. For this reason, the wrong-way alert apparatus 10 is capable of determining whether the own vehicle is travelling the wrong way based on the discrimination results of the front-side or backside of extracted effective signs.

Specifically, the wrong-way alert system 1 according to the present embodiment determines whether the own vehicle is travelling the wrong way as a function of the discrimination results of the front-side or backside of extracted effective signs without using the aforementioned size difference. That is, the size difference represents the difference between the size of a traffic sign recognized when the own vehicle is travelling on the ordinary road and the size of the same traffic sign recognized when the vehicle is travelling the wrong way.

For this reason, the wrong-way alert system 1 according to the present embodiment determines whether the own vehicle is travelling the wrong way with little influence of the classification and the configuration of the road on which the own vehicle is running. As described above, the classification of a road represents whether the road is a highway with little disturbance or a normal road, and the configuration of a road represents whether there are medians on the road, and whether there are lanes on the road.

Specifically, the wrong-way alert apparatus 10 determines whether the own vehicle is travelling the wrong way as a function of the ratio between the number of backside effective signs and the number of recognized effective signs, i.e. the back occurrence ratio RRD(n).

For example, as illustrated in FIG. 2(b), when the own vehicle V1 is travelling a lane in the normal direction, i.e. forward direction, sign candidates located on the running lane side in the field of view FOV of the vehicular camera 21 of the own vehicle V1, which are close to the own vehicle V1, are reliably recognized as front-side effective signs RS2. On the other hand, backside sign candidates, which are contained in a blind spot of the field of view FOV, are not recognized as effective signs. In addition, even if backside effective signs located on the opposite lane side are contained in the field of view FOV, which are distant from the own vehicle V1, are likely to be recognized as ineffective signs. Thus, the backside occurrence ratio RRD(n) becomes low when the own vehicle V1 is travelling a lane of a road in the forward direction.

In contrast, when the own vehicle V2 is travelling on an opposite lane in the wrong direction, sign candidates located on the opposite lane side in the field of view FOV of the vehicular camera 21 of the own vehicle V1, which are close to the own vehicle V2, are reliably recognized as backside effective signs RS1. On the other hand, front-side sign candidates, which are contained in a blind spot of the field of view FOV, are not recognized as effective signs. In addition, even if front-side effective signs located on the normal lane side are contained in the field of view FOV, which are distant from the own vehicle V2, they are likely to be recognized as ineffective signs. Thus, the backside occurrence ratio RRD(n) becomes high when the own vehicle V2 is travelling an opposite lane of a road in the wrong direction.

The wrong-way alert system 1 according to the present embodiment therefore suitably sets a value of the threshold. This enables the wrong-way alert system 1 to determine whether the own vehicle is travelling the wrong way as a function of the results of comparison between the backside occurrence ratio RRD(n) and the threshold.

The wrong-way alert system 1 according to the present embodiment also outputs a ratio indicative of whether the own vehicle is travelling the wrong way. This enables the wrong-way alert system 1 to perform detailed tasks based on the ratio indicative of whether the own vehicle is travelling the wrong way.

The algorithm of the wrong-way alert task used by the wrong-way alert system 1 as illustrated in FIGS. 3 and 4 has a simpler structure based on comparison between the backside occurrence ratio RRD(n) and the threshold. This enables the wrong-way alert system 1 according to the present embodiment to be simply and inexpensively constructed.

Additionally, if it is determined that disturbance sign candidates, which correspond to specified sign symbols, are contained in sign candidates extracted from a captured image, the wrong-way alert apparatus 10 eliminates the disturbance sign candidates from effective signs; the effective signs are used to calculate the backside occurrence ratio RRD(n).

The wrong-way alert system 1 described above enables specific signs for pedestrians, such as double-sided signs, to be eliminated as disturbances from extracted effective signs. This improves the accuracy of wrong-way determination.

The wrong-way alert apparatus 10 eliminates sign candidates corresponding to at least one of traffic signs for pedestrians and double-sided signs recognizable from both sides thereof as disturbances from extracted effective signs. This further improves the accuracy of wrong-way determination.

The wrong-way alert apparatus 10 recognizes right and left edges of the road on which the own vehicle is travelling, and eliminates sign candidates located outside scopes established based on the recognized edges. Each of the scopes represents, for example, a range on which traffic signs, which are located to be further out than edges of the road.

The wrong-way alert system 1 described above eliminates traffic signs located outside the scopes, which are recognized based on the road edges, as disturbances. This enables the wrong-way alert apparatus 10 to calculate the backside occurrence ratio RRD(n) while eliminating, from the sign candidates, traffic signs located on another parallel road, which is in parallel to the road on which the own vehicle is running, and signs located across the medians on the road. This still further improves the accuracy of wrong-way determination.

The wrong-way alert apparatus 10 obtains the classification of the road on which the own vehicle is running, and sets the wrong-way determination threshold suitable for the road on which the own vehicle is running based on the road classification. Then, the wrong-way alert apparatus 10 compares the backside occurrence ratio RRD(n) with the wrong-way determination threshold to determine whether the own vehicle is running on the wrong way accordingly.

Specifically, the classification of the road on which the own vehicle is running changes how easy traffic signs located on the opposing lane are contained in a captured image. For this reason, a value of the backside occurrence ratio RRD(n) changes depending on the road classification. Thus, the wrong-way alert apparatus 10 changes the threshold used for determining whether the own vehicle is travelling the wrong way according to the classification of the road on which the own vehicle is running.

The wrong-way alert system 1 described above enables the threshold suitable for the classification of the road on which the own vehicle is running to be set. This improves the accuracy of wrong-way determination.

Note that, when outputting the backside occurrence ratio RRD(n) as a parameter for wrong-way determination, the wrong-way alert apparatus 10 is capable of performing wrong-way determination based on the results of comparison between at least one threshold set described above and the backside occurrence ratio RRD(n).

The wrong-way alert apparatus 10 determines the mode of outputting an alert based on the probability that the own vehicle is travelling the wrong way, and activates alert hardware devices based on the determined mode.

The wrong-way alert system 1 described above sets the mode of outputting an alert according to the probability, i.e. possibility, that the own vehicle is travelling the wrong way. This enables an alert to be output even if the probability that the own vehicle is travelling the wrong way is low. This also reduces adverse effects to the occupants if a false alert is issued.

The wrong-way alert apparatus 10 deactivates the hardware devices by alert means when detecting previously determined driver's operations.

The wrong-way alert system 1 described above enables the output of an alert to be stopped in response to a previously determined driver's operation.

The wrong-way alert apparatus 10 outputs signals based on the wrong-way determination results to at least one of the inside of the own vehicle and the outside of the own vehicle.

The wrong-way alert system 1 described above enables an alert to both the inside and outside of the own vehicle if the own vehicle is travelling the wrong way. For example, it is possible to output signals based on the wrong-way determination to display, on an electrical message board or the display of another vehicle, information showing that there is a wrong-way vehicle.

The wrong-way alert apparatus 10 outputs signals for informing that the own vehicle is travelling the wrong way to informing devices located outside the own vehicle, such as electrical message board located on the corresponding road or alerting devices installed to another vehicle.

The wrong-way alert system 1 described above enables the wrong-way travelling of the own vehicle to be informed to, for example, another vehicle if the own vehicle is travelling the wrong way.

The wrong-way alert apparatus 10 outputs a signal to stop the own vehicle upon determining that the own vehicle is travelling the wrong way.

The wrong-way alert system 1 described above enables the own vehicle to be stopped if the own vehicle is travelling the wrong way.

The wrong-way alert apparatus 10 determines whether the own vehicle is overtaking another vehicle, and disables the determination that the own vehicle is travelling the wrong way upon determining that the own vehicle is overtaking another vehicle.

The wrong-way alert system 1 described above prevents the own vehicle from being determined as the wrong-way travelling if the own vehicle is temporarily travelling on the opposing lane to overtake another vehicle.

The wrong-way alert apparatus 10 recognizes, from the shape of a sign candidate, shapes or colors, which are previously set as features of the backsides of traffic signs. The wrong-way alert apparatus 10 determines that some of sign candidates, whose features of their backsides are recognized, and some of the sign candidates, whose sign symbols are unrecognized, are sign candidates whose sign symbols are unrecognized.

The wrong-way alert system 1 described above positively recognizes the backsides of signs, thus improving the accuracy of discriminating backside effective signs.

While the illustrative embodiment of the present disclosure has been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Reference numerals used in the description of the embodiments are used to the claims, but the reference signs are used only for easy understanding of the invention of each claim, and therefore, the reference signs do not restrict the scope of each claim.

The wrong-way alert apparatus 10 described in the present embodiment performs the wrong-way determination using the backside occurrence ratio, but the present invention is not limited thereto. Specifically, the wrong-way alert apparatus 10 can perform the wrong-way determination using both the backside occurrence ratio and the front-side occurrence ratio.

For example, the ratio of backside sign candidates contained in sign candidates, which are contained in captured images, is calculated as the backside occurrence ratio RRD(n) according to the present embodiment. The ratio of backside sign candidates contained in sign candidates, which are contained in a captured image, can be calculated as the backside occurrence ratio RRD(n).

The present embodiment eliminates sign candidates located on the excluded zones from effective signs in step S260. However, the first embodiment can eliminate sign candidates located on the excluded zones from sign candidates extracted in step S210 before performing the operation in step S250, which recognizes effective signs in the sign candidates.

Figure 6B:
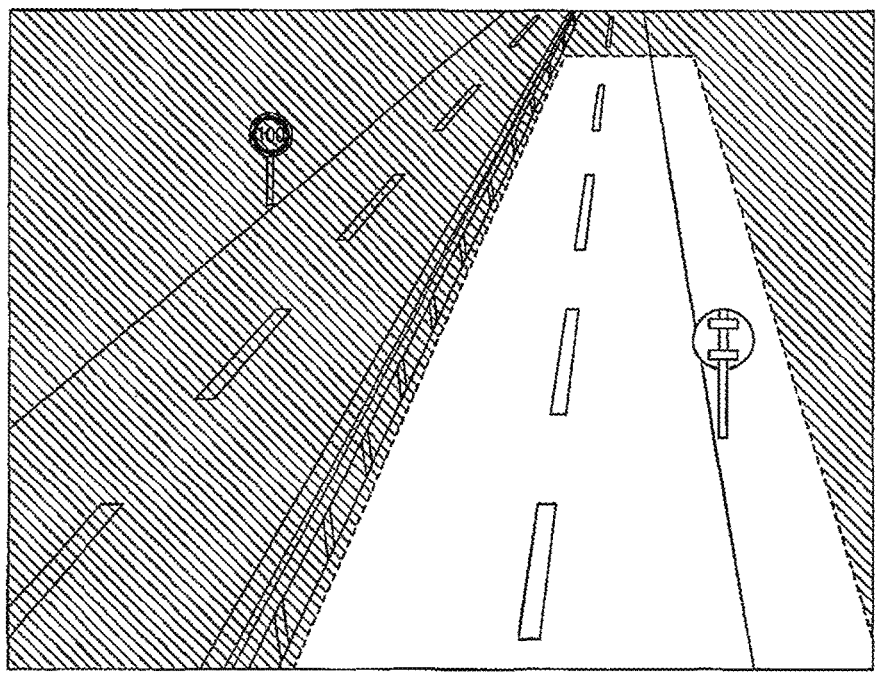
FIG. 6(b) is an explanatory view illustrating another example of the except areas.

The present embodiment establishes the excluded zones based on the edges of the road. However, the first embodiment can establish medians themselves as excluded zones if the medians are present on a road (see FIG. 6(b)). In detail, the present embodiment can establish a boundary on one right or left edge of the road, on which no medians are located, such as the right edge in FIG. 6(b). The boundary is located across a predetermined scope from the right edge of the road; the predetermined scope represents a scope on which traffic signs are estimated to be located. This enables an area outside the boundary to be recognized as an excluded zone.

It is possible to establish, on a road on which medians are located, a boundary to cause the medians to be located on an excluded zone. Specifically, traffic signs located across the medians or traffic signs located on the medians can be eliminated from sign candidates.

The advantage of this modification is that signs required for wrong-way determination are not likely to be located on medians, in other words, signs, which are likely disturbances for wrong-way determination, are located on the medians.

The wrong-way alert system 1 according to this modification is capable of eliminating traffic signs, which are unused for wrong-way determination, thus performing wrong-way determination with higher accuracy. This also eliminates traffic signs located across the medians in addition to the traffic signs on the medians as disturbances. This enables the backside occurrence ratio RRD(n) to be a noticeable value, thus improving the accuracy of wrong-way determination.

| 1 Wrong-way alert system | 10 Wrong-way alert apparatus |
|---|---|
| 11 CPU     12 Memory | 21 Vehicular camera |
| 25 Navigation apparatus | 31 Sound-wave generator |
| 32 Hazard flashing apparatus | 33 Mete panel apparatus |
| 34 Steering-wheel vibrator | 35 Steering controller |
| 36 Brake controller | 37 Engine controller |
| 38 Traffic information display | 39 Other vehicles |

The invention claimed is:

1. A wrong-way determination apparatus for determining whether a vehicle is travelling a wrong way comprising:
    an extracting means for extracting at least one sign candidate from a captured image of at least one of a front view and a rear view of the vehicle, the at least one sign candidate having a shape of a traffic sign;
    a discriminating means for discriminating between a front-side or backside of at least one sign candidate; and
    a wrong-way determining means for determining whether the vehicle is travelling the wrong way based on a result of the front-side or backside discrimination,
    wherein:
    the captured image comprises a plurality of frame images; and
    the wrong-way determining means is configured to determine whether the vehicle is travelling the wrong way based on:

the number of one or more sign candidates that are discriminated as the front-side; and the number of one or more sign candidates that are discriminated as the backside.

2. The wrong-way determination apparatus according to claim 1, wherein:

the wrong-way determining means is configured to obtain, based on the result of the front-side or backside discrimination, as information indicative of a probability that the vehicle is travelling the wrong way, at least one of (i) the ratio of one or more sign candidate discriminated as the front-side to the plurality of sign candidates and (ii) the ratio of one or more sign candidate discriminated as the backside to the plurality of sign candidates.

3. The wrong-way determination apparatus according to claim 1, wherein:

the extracting means comprises:

an eliminating means for eliminating, from the plurality of sign candidates, at least one sign candidate including a previously determined specific sign symbol when the at least one sign candidate is recognized in the plurality of sign candidates.

4. The wrong-way determination apparatus according to claim 1, further comprising:

an alert means for activating a hardware device that issues an alert based on the determination of whether the vehicle is travelling the wrong way.

5. A wrong-way determination apparatus for determining whether a vehicle is travelling a wrong way comprising:

an extracting means for extracting at least one sign candidate from a captured image of at least one of a front view and a rear view of the vehicle, the at least one sign candidate having a shape of a traffic sign;

a discriminating means for discriminating between a front-side or backside of at least one sign candidate; and a wrong-way determining means for determining whether the vehicle is travelling the wrong way based on a result of the front-side or backside discrimination, wherein:

the captured image comprises a plurality of frame images obtained by successively capturing a least one of the front view and the rear view of the vehicle in frame; and the wrong-way determining means is configured to determine whether the vehicle is travelling the wrong way when the number of backside signs discriminated successively is larger than a predetermined number.

6. The wrong-way determination apparatus according to claim 5, wherein:

the wrong-way determining means is configured to obtain, based on the result of the front-side or backside discrimination, as information indicative of a probability that the vehicle is travelling the wrong way, at least one of (i) the ratio of one or more sign candidate discriminated as the front-side to the plurality of sign candidates and (ii) the ratio of one or more sign candidate discriminated as the backside to the plurality of sign candidates.

7. The wrong-way determination apparatus according to claim 5, wherein:

the extracting means comprises:

an eliminating means for eliminating, from the plurality of sign candidates, at least one sign candidate including a previously determined specific sign symbol when the at least one sign candidate is recognized in the plurality of sign candidates.

8. The wrong-way determination apparatus according to claim 5, further comprising:

an alert means for activating a hardware device that issues an alert based on the determination of whether the vehicle is travelling the wrong way.

* * * * *